US006897977B1

(12) United States Patent
Bright

(10) Patent No.: US 6,897,977 B1
(45) Date of Patent: May 24, 2005

(54) LOSSY METHOD FOR COMPRESSING PICTURES AND VIDEO

(75) Inventor: Walter G. Bright, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 904 days.

(21) Appl. No.: 09/718,879

(22) Filed: Nov. 20, 2000

(51) Int. Cl.[7] .............................................. G06F 15/02
(52) U.S. Cl. ...................................... 358/1.18; 358/1.9
(58) Field of Search ................................ 358/1.1, 1.15, 358/1.12, 1.13, 1.9; 382/232, 242, 243; 345/420, 418

(56) References Cited

U.S. PATENT DOCUMENTS 5,905,502 A * 5/1999 Deering ...................... 345/420
6,496,601 B1 * 12/2002 Migdal et al. .............. 382/239

2002/0050992 A1 * 5/2002 Deering ...................... 345/423

* cited by examiner

Primary Examiner—Gabriel Garcia
(74) Attorney, Agent, or Firm—Schwabe, Williamson & Wyatt, P.C.

(57) ABSTRACT

A recursive scheme is employed to compress image data, wherein areas of a pixel grid corresponding to the image data are divided into increasingly smaller triangles based on the level of detail contained within each triangle. Data is stored defining each of the triangles and actual/predicted component values corresponding to pixels within each triangle. For each triangle, a set of predicted component values are determined, based on actual component values at the vertices of the triangle or actual component values on or proximate to the edges of the triangle. The predicted component values for the pixels are compared with the corresponding actual component values to see if a similarity threshold is met. If met, the processing of a current triangle is complete and the processing of a next triangle begins. If not, the current triangle is divided, and the foregoing process is then repeated. Texture mapping may also be applied.

30 Claims, 9 Drawing Sheets

100, 102    *FIG. 5B*

LOSSY METHOD FOR COMPRESSING PICTURES AND VIDEO

BACKGROUND OF THE INVENTION

1. Field of the Invention

The present invention generally relates to techniques for compressing graphic and video data, and in more particular concerns lossy methods for compressing graphics and video.

2. Background Information

Image and video data compression refers to a process in which the amount of data used to represent images and video is reduced while the quality of the reconstructed image or video satisfies a requirement for a certain application and the complexity of computation involved is affordable for the application. Various compression schemes have been developed over the years, including both lossy and lossless schemes. As their respective names imply, in a lossy compression scheme some aspect of the original data is discarded (lost), because it was deemed unnecessary to the final application, while in a lossless scheme the original data is reproduced when the compressed image or video is decompressed.

Image and video data, like other computer data, is encoded as a series of bits. A typical still color image comprises a plurality of pixels laid out in a grid called a bitmap having multiple bitplanes laid on top of one another, wherein the number of bitplanes corresponds to the potential color resolution of the image when it is displayed on an output device such as a printer or monitor. For example, an 8-bit(plane) bitmap has a limit of 256 different colors, while a 16-bit(plane) bitmap has a limit of 65536 different colors. In addition to color images, there are black and white images (also known as monochrome, comprising one bit plane), and grayscale bitmaps (typically comprising four or eight bit planes).

In an original bitmap, data corresponding to each pixel of data must occupy a memory space equal to the number of bitplanes in the bitmap. Accordingly, a 1024×1024 pixel 24-bit bitmap requires three Mbytes of memory if it was to be stored in its original format. This is clearly excessive, and provided the original motivation for developing compression schemes to reduce the amount of memory required to store images.

When a wider range of colors is needed, it requires mixing a limited number of primary colors. There are two fundamental color mixing schemes, RGB and CMYK, depending upon the intended output medium. RGB color stand for the red, green, and blue additive primary colors typically used in devices that emit light, such a computer monitors. CMYK color stands for the cyan, magenta, and yellow subtractive primary colors, plus black for contrast, typically used for printed materials. A larger value for a given primary results in larger spots of that color, applied in a fine pattern on a white page. Each of the three primary inks absorbs certain colors from the white light impinging on the printed page. Because CMYK operates by removing specific colors from white, it is called subtractive color.

An increasingly popular color specification method called HIS can be used independently of the mixing scheme. HIS stand for Hue, Saturation, and Intensity. Hue is what a person thinks of as the color of an object, such as orange, green or purple. Saturation describes the amount of white. The brown color of baking chocolate, for example, is very saturated, while the color of milk chocolate is the same hue, but less saturated. Intensity describes the brightness and, for example, is mainly what distinguishes an orange in sunlight form an orange in shade. Also, the word luminosity is often substituted for intensity in which case HSI becomes HSL.

Initially, image data was compressed using schemes originally designed for compressing text data—that is schemes that only considered the binary content and not the qualitative content of the data. These schemes include run-length compression, wherein a series of repeated values (i.e., identical adjacent pixels) are replaced by a single value and a count, Huffman encoding, which uses shorter codes for frequently occurring things and longer codes for infrequently occurring things, LZW (Lempel, Ziv and Welch) compression, an adaptive version of Huffman encoding, and arithmetic compression. These schemes are all candidates for lossless or near lossless compression. However, they are limited in how much compression they can produce, and are therefore not suitable for many compression requirements. An example of a popular compression scheme that uses a variable-length LZW compression algorithm is the GIF (Graphics Interchange Format), which is presently limited to 256 24-bit colors, has no provisions for storing grayscale or color-correction data, and doesn't support the CMYK or HIS models.

The most commonly cited lossy compression scheme is the baseline algorithm of JPEG (the Joint Photographic Experts Group of the International Standards Organization (ISO). Although JPEG defines several algorithms, the most commonly referred to as JPEG is the lossy, baseline algorithm. JPEG algorithms begin by separating the chroma (color) information from the luminance (brightness) information, to take advantage of the human eye's tolerance for lower color resolution. Next, the image is broken up into smaller rectangular tiles comprise 8×8 groups of pixels. The lossy algorithm then applies a mathematical technique to the tiles, known as Discrete Cosine Transform (DCT). After this transformation, individual pixels no longer exist. Rather, they are represented by a series of patterns describing how rapidly the pixels vary. Since individual pixel identities are lost in DCT, this form of JPEG is called lossy.

A primary disadvantage with JPEG is that there may be discontinuities at the boundaries of each tile. For example, while JPEG does a fairly good job of providing continuity (i.e., no rapid changes) in adjacent pixels within each tile, there is no provision for blending the pixels of the outlines of the tiles. As a result, some JPEG images, especially those that apply a high compression ratio, look like a set of tiles that are reassembled together to form a composite image. Ideally, a viewer should not perceive that individual tiles are used. This problem is especially pronounced when scaling images. Accordingly, it is desired to provide an image and video compression scheme that provides similar benefits to JPEG compression, but eliminated the discontinuities that are often caused by the compression scheme.

SUMMARY OF THE INVENTION

The present invention provides a lossy compression scheme that addresses many of the limitations found in the prior art by enabling data corresponding to still images and video frames to be compressed and decompressed such that pixel discontinuities are substantially unnoticeable, even when images are scaled. The invention employs a recursive division and comparison scheme, wherein areas of a grid corresponding to the image data are divided into increasingly smaller triangles based on the level of detail contained within each triangle. For instance, areas with a lot of detail will comprise many small triangles, while areas with less detail will have larger triangles. Data is then stored defining each of the triangles and actual and/or predicted component values corresponding to pixels within each triangle. [In one embodiment, the data defining a triangle are data defining the vertices of the triangle.]

According to a first aspect of the invention, a method is provided for compressing data corresponding to still images and video frames comprising a plurality of pixels arranged in a grid. Initially, each pixel will have a one or more component values, such as a grayscale intensity for grayscale images or RGB component values for color images. The grid of pixels is divided into one or more rectangular areas, preferably by using a small number of squares. Each rectangular area is then evaluated independently of one another in the following recursive manner. The area is divided into a number of triangles splitting the area. For each triangle, a set of predicted component values are determined, based on actual component values at the vertices of the triangle or actual component values on or proximate to the edges of the triangle. Preferably, the predicted component values are determined by interpolating the actual component values at the vertices or along the triangle edges. The predicted component values for the pixels within the triangle are then compared with the corresponding actual component values to see if a similarity threshold is met. In brief, this test is to determine whether the area of the still image or video frame occupied by the triangle when the image is decompressed and rendered is similar to how the same area appears prior to compressing the image, whereby the similarity threshold controls the level of detail that must be maintained. Preferably, the similarity threshold may be specified by a user, or set at a default value. Additionally, the user may specify that one or more particular areas within the image be maintained at a greater level of detail than other areas. Further, the user may also specify that certain "transparent" areas be not described.

If the similarity threshold is met, the processing of a current triangle is complete and the processing of a next triangle begins. If the similarity threshold is not met, an optional texture mapping determination is performed. In this determination, the component values of the pixels within the triangle are evaluated to see if they from a pattern corresponding to a predefined texture map. If a match is found, the matching texture map is recorded along with the vertices of the triangle. If no match is found, or if the texture mapping determination is not used, the current triangle is divided in half to make two new triangles, preferably along a line connecting the midpoint of the triangle's hypotenuse with its right angle corner. The foregoing process is then repeated for each of the new triangles. As a result, image data are advantageously represented by a number of triangles with no discontinuities from one triangle to its adjacent neighbor. Further, the triangles will be subdivided such that there are many small triangles corresponding to areas in the image that have a lot of detail, while larger triangles may be used for areas that have lesser detail and areas in which texture mapping is applicable.

In accord with further aspects of the invention, a system is provided for implementing the method comprising a processor and memory in which machine instructions are stored that when executed by the processor, perform the functions of the method discussed above. In addition, an article of manufacture is provided having machine instructions stored thereon for implementing the method when the machine instructions are executable by a suitable system, such as a personal computer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5B shows an exemplary set of triangles that are produced when compressing the image of FIG. 5B with the present invention, wherein the triangles are overlaid on the image;

DETAILED DESCRIPTION

Figure 1A:
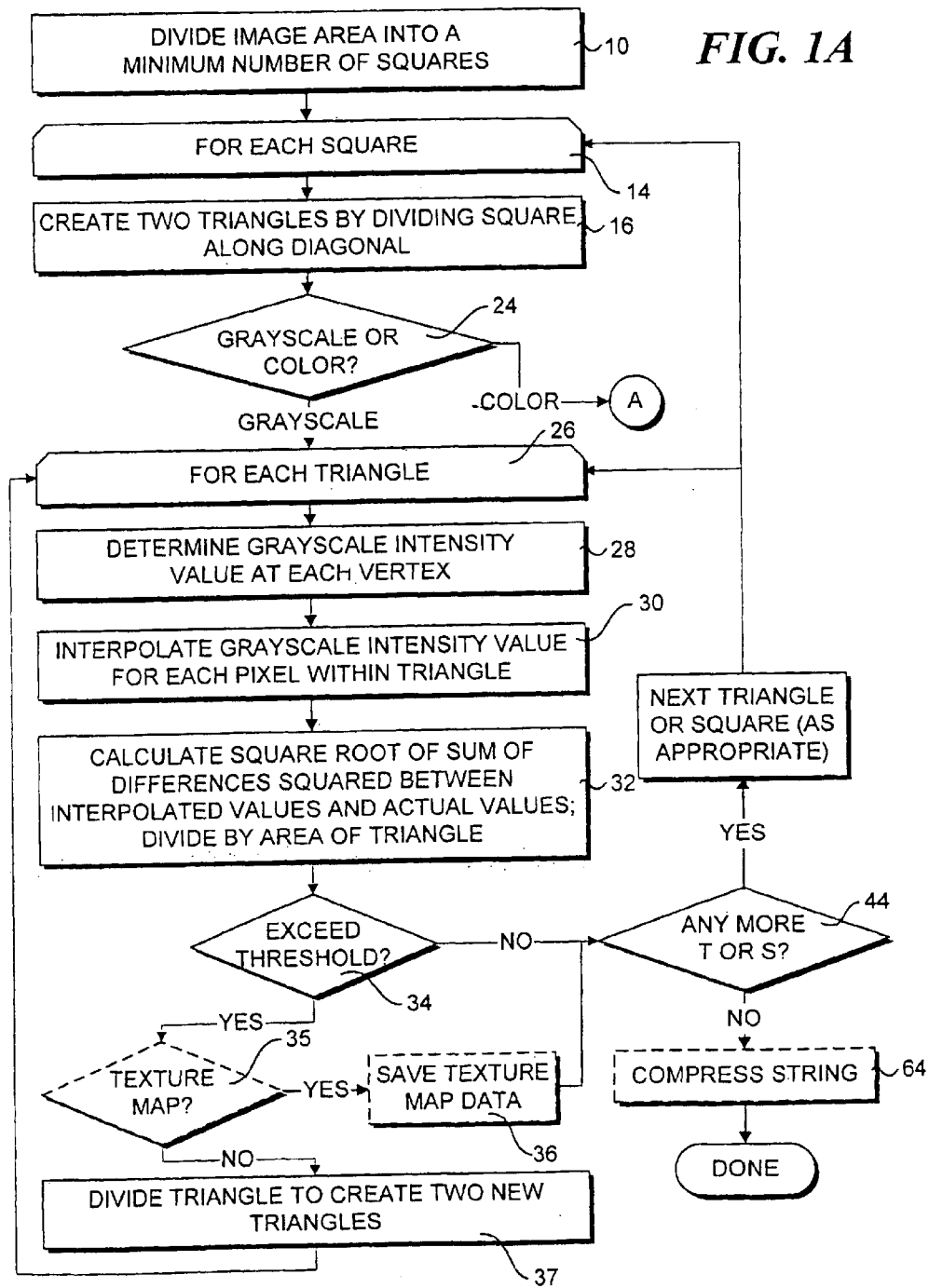
FIG. 1A is a flowchart illustrating the logic used by the present invention when compressing image data corresponding to a grayscale image.
Figure 1B:
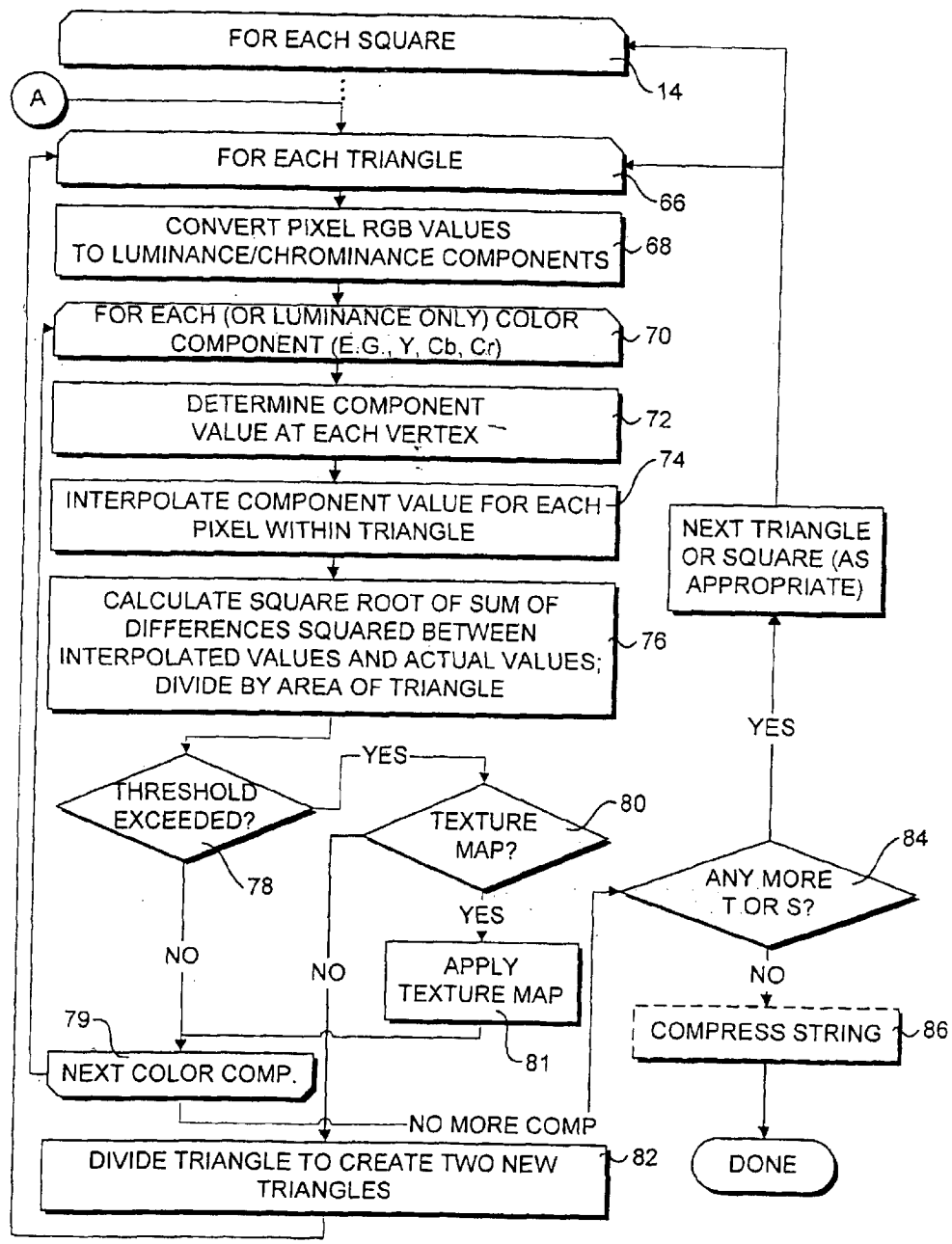
FIG. 1B is a flowchart illustrating the logic used by the present invention when compressing image data corresponding to a color image.

With reference to the logic flowchart of FIGS. 1A–B, the method for compressing image data in accord with the present invention starts in a block 10 in which the image area (i.e., pixilated grid for a still image or video frame) is divided into one or more rectangular elements, preferably squares. Although rectangles of any shape may be used, using squares will ensure that each triangle will comprise sides coincident with a set of pixels, and that each triangle formed will comprise a right triangle, simplifying the interpolation calculations discussed below. In addition, the squares should be configured such that a relatively small number of non-overlapping squares are used. Further, description of transparent areas may be skipped.

Figure 2:
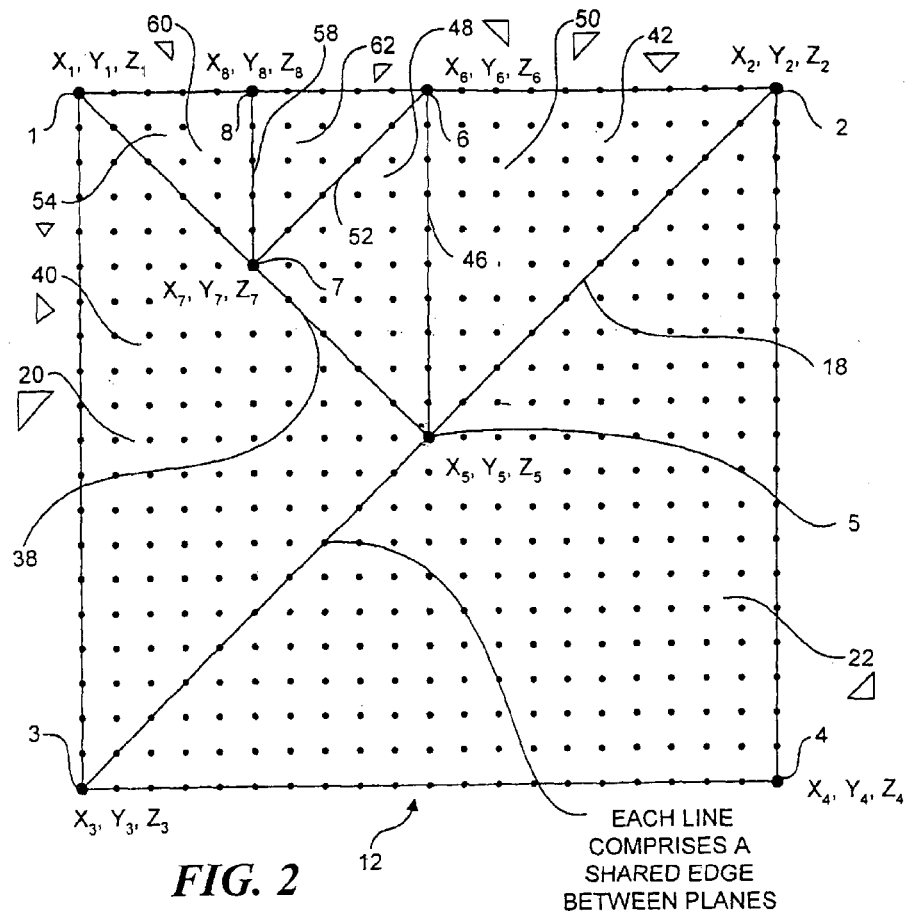
FIG. 2 shows how various triangles are created by the present invention when starting with an initial square grid of pixels.
Figure 3:
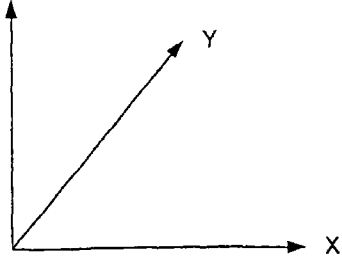
FIG. 3 depicts an XYZ coordinate axis set for illustrating how image data corresponding to each pixel is maintained, wherein the X and Y axis correspond to the X and Y position of a pixel within an image, and the Z value corresponds to a grayscale or a color component value.

FIG. 2 shows a 20×20 pixel grid 12 comprising four corner points 14 and four points within the grid labeled 5–8 corresponding to an exemplary square area created by block 20. For simplicity, an area comprising only a small number of pixels are considered in the following discussion. It will be understood by those skilled in the art that actual still images and video frames may comprise 1000 or more pixels along each axis, and that a given square or rectangular area might comprise sides with similar lengths. Each point in grid 10 is defined by three component values including an X component, a Y component, and a Z component, wherein the subscripted numbers correspond to that point (e.g., $X_1,Y_1,Z_1$ corresponds to point 1, etc.). The X and Y components represent the location of each pixel on a planar X-Y grid, such as the grid of a display monitor. As shown in FIG. 3, the Z component represents a component value of the pixel. As explained in further detail below, for grayscale images a single grayscale intensity component value will be used, while for color images, three component values will generally be used.

In a first recursive iteration, the following process is applied to each square defined above, as indicated by a start loop block 14. In accord with a block 16, each square is divided along a diagonal to form two triangles. For example, grid 12 is divided along a line 18 to form a triangle 20 having vertices at corners 1, 2 and 3, and a triangle 22 having vertices at points 2, 3, and 4. Each of triangles 20 and 22 define a plane in XYZ space, wherein line 18 comprises a shared edge between the planes, and the Z component corresponds to a "height" of the plane.

Next, a determination is made to whether the image is a grayscale or color image in a decision block 24. It is noted that this determination is made only once per image or video frame, and may be made prior to the start of the process, if desired. If the image is grayscale, the logic proceeds to a start loop block 26, in which the following steps are iterated recursively for each triangle created by block 16 and subsequent triangles defined within the process.

First, a grayscale intensity value is determined at each vertex of the triangle, as provided by a block 28. For example, if triangle 20 is currently being evaluated, grayscale intensity values will be determined for the pixels corresponding to points 1, 2, and 3. A grayscale intensity value for each pixel within the triangle is then interpolated from the vertex values in a block 30. In general, the interpolation will comprises a linear interpolation, but other interpolations may be used as well, depending on the rate of change in the grayscale intensity of the pixels across a given triangle. For example, a second order interpolation may be better suited than a first order interpolation. The order of the interpolation will depend on the actual component values of the pixels. In a block 32, a similarity calculation is then made to determine a relative difference between the actual grayscale intensity values of the pixels within the triangle and the interpolated values by taking summing the squared differences and taking the square root of the sum divided by the area of the triangle. In one embodiment, a second criterion based on the difference between the actual intensity and the interpolated intensity is also employed to determine similarity.

The logic next flows to a decision block 34, wherein a determination is made to whether a similarity threshold value is exceeded, wherein the threshold value establishes a minimum level of similarity between the grayscale intensity values of the interpolated pixels and the actual values of the pixels. In essence, the purpose of the foregoing similarity calculation and threshold evaluation is to determine if the interpolated intensity values of the pixels within the triangle are close enough to the actual values such that any loss of detail in the area of an image corresponding to the triangle when it is reproduced (i.e., following decompression of the image data) are limited to the selected threshold level. The threshold level is user-controllable or set to a default value, and may be defined as a single value for an entire image, or may be defined at different levels for one or more areas within the image, as explained in further detail below.

For the illustrated embodiment, if the threshold limit is exceeded, the logic next flows to an optional decision block 35 in which a determination is made to whether a texture map may be applied to the triangle. There are many instances in which one or more portions of an image contain a repeated pattern of pixel intensities that create a "textured" appearance in the image. Accordingly, in optional decision block 35 the actual intensity values of the pixels are examined to see if a texture pattern exists by comparing these values with a set of predefined texture patterns using one or more pattern recognition algorithms that are well-known in the art. If texture mapping is applicable, the predefined texture map pattern is identified along with intensity data in a block 36. The intensity data controls how the texture map is applied during the decompression process described below.

If no match with a predefined pattern is found, the current triangle is divided to create two new triangles in a block 37. Preferably, the triangle is divided by creating a line from the midpoint of the hypotenuse of the triangle to its right angle corner. For example, triangles 20 and 22 were created with dividing line 18, which is the hypotenuse for both triangles 20 and 22 and has a midpoint at a point 5. Accordingly, a dividing line 38 is used to connect point 5 with point 1 (the right angle corner of triangle 20) to form two new triangles 40 and 42. In alternate embodiments, non-equal triangles may be used instead. The logic then flows back to block 26 and the process is repeated again for triangle 40.

Suppose that triangle 40 contains little detail such that the similarity threshold value is not exceeded when triangle 40 is evaluated, or a suitable texture map is identified. Accordingly, the logic will proceed to a decision block 44 in which a determination is made to whether there are any more triangles or squares to process. In this case, triangles 42 and 22 still have to be evaluated, so the answer to decision block 44 is yes, and the logic proceeds to start block 26, and the processing of triangle 42 begins. Although the order that the triangles are processed is not critical, it is preferable to work on the most-recently divided triangle first.

This time, suppose that triangle 42 contains a moderate level of detail towards its top left-hand corner, resulting in the threshold value being exceeded. As a result, in block 36 triangle 42 is divided by a line 46 extending from a point 6 of the hypotenuse of triangle 42 to point 5, which corresponds with the right angle corner of triangle 42, thereby creating a new pair of triangles 48 and 50 (which for ease of understanding, are equal triangles). The logic then flows back to start block 26 in which triangle 48 is evaluated. Upon evaluation of triangle 48, it is determined that it needs to be divided in half by creating a line 52 from a point 7 (the midpoint of its hypotenuse) to point 6 (its right angle corner), thereby creating triangles 54 and 56. Similarly, upon evaluation of triangle 54, it is also determined that this triangle needs to be divided in half, which is accomplished by creating a line 58 from a point 8 (at the midpoint of the hypotenuse for triangle 54 to point 7 (the right hand corner for triangle 54), creating triangles 60 and 62.

Now suppose that when triangle 62 is evaluated, it is determined that the threshold value is not exceeded. As a result, the answer to decision block 34 is no and the answer to decision block 44 is yes, since triangles 62, 56, 50 and 22 are still yet to be evaluated. Further suppose that when each of triangles 62, 56, 50 and 22 are evaluated, the similarity threshold value is not exceeded, resulting in no additional triangles being produced. After the evaluation of triangle 22, the answer to decision block 44 is no to triangles (all the triangles in the square (i.e., grid 12) have been evaluated), and no to squares if no more squares are to be processed. If another square needs to be processed, the logic flows back to start block 14, and the preceding process is repeated iteratively until all of the triangles in the new square meet the similarity threshold criteria. At this point, data defining each triangle and actual and/or predicted pixel component values will be stored in memory or on a persistent storage device as a file, preferably in a binary form. In one embodiment, the data defining a triangle are data defining the vertices of the triangle. Further, the data will indicate whether extrapolation is employed, and if employed, the kind of extrapolation employed. For example, suppose that linear interpolation is used for all of the triangles within an image. In this case, information in a header portion of a data file could indicate that linear interpolation was used on all triangles, whereby the only information that would be needed is the XY values of the vertices of each triangle, and the Z component value(s) for the pixels at those vertices. In other instances, the data may include information corresponding to the interpolation of each triangle, identification of an applicable texture map for the triangle, pixel XY and component values if the edges of triangles are used for interpolation, etc. Thus, under the presentation, image data are advantageously represented by a number of triangles with no discontinuities from one triangle to its adjacent neighbor.

Once processing of all of the squares have been completed and the corresponding data has been stored, the logic flows to a block 64 in which an optional data compression function is performed to reduce the size of a resulting compressed image data. For instance, an initial compressed image file may comprise a list of the vertices of the triangles and corresponding grayscale intensities values that are determined during the processing of all the squares within the current image being compressed. This list typically will be in the form of a string of bits or characters. In addition, if texture mapping is applicable for any of the triangles, the compressed image data will include a string or data structure for each instance of texture mapping identifying the vertices of the triangle and the appropriate pre-defined texture map. These strings may then be compressed in block 64 by one of several well-known data compression algorithms, including Huffman encoding, LZ (Lempel and Ziv) and LZW (Lempel, Ziv and Welch) compression, and arithmetic compression.

Compressing Color Images

The process for compressing color images with the present invention is similar to the process discussed above with respect to compressing grayscale images except that each pixel in a color image comprises three components rather than a single component. For example, color images are typically represented on video displays through use of the red-green-blue (RGB) color model. This is due to the following feature of the human perception of color. The color sensitive area in the human vision system (HVS) consists of three different sets of cones, wherein each set is sensitive to the light of one of the three primary colors: red, green, and blue. Consequently, any color sensed by the HVS can be considered as a particular linear combination of the three primary colors. This result has been shown by numerous studies.

The RGB model is used mainly in color image acquisition and display. For example, in a 24-bit display system, 8 bits is allocated for each of the red, green and blue color components. Additionally, display monitors are designed with three sets of electron guns and corresponding masks, one for each of the primary colors. As a result, it generally is necessary to start with an RGB representation of an image or video frame when compressing these images.

Although images are displayed using the RGB model, in color signal processing, including image and video compression, various luminance-chrominance color models are more efficient and widely used. This has something to do with the color perception of the HVS. It is known that the HVS is more sensitive to green than to red, and is least sensitive to blue. An equal representation of red, green, and blue leads to inefficient data representation when the HVS is the ultimate viewer. Allocating data in accord with the perceptions of the HVS results provides more efficient encoding.

In a luminance-chrominance color models, luminance is concerned with the perceived brightness, while chrominance is related to the perception of hue and saturation of color. Roughly speaking, the luminance-chrominance representation agrees more with the color perception of the HVS. This feature makes luminance-chrominance color models more suitable for color image processing.

Common luminance-chrominance color models that are implemented in imaging systems include the HIS (Hue, Intensity, Saturation) model, the YUV model (used for PAL (Phase Alternating Line) TV systems), the YIQ model (used for NTSC (National Television Systems Committee) TV systems), the YDbDr model (used in the SECAM (Sequential Couleur a Memoire) TV system), and the YCbCr model, which is used for the JPEG and MPEG international coding standards.

Under the YCbCr model, Y corresponds to the luminance, while Cb and Cr correspond to chrominance values. The following equation is used to convert RGB values to YCbCr values.

$$\begin{pmatrix} Y \\ Cb \\ Cr \end{pmatrix} \begin{pmatrix} 0.257 & 0.504 & 0.098 \\ -0.148 & -0.291 & 0.439 \\ 0.439 & -0.368 & -0.071 \end{pmatrix} \begin{pmatrix} R \\ G \\ B \end{pmatrix} + \begin{pmatrix} 16 \\ 128 \\ 128 \end{pmatrix} \quad (1)$$

It is well-known that the HVS is much more sensitive to the luminance component than to the chrominance components. This leads to a common practice in color image and video encoding: using full resolution for the intensity component, while using a 2 by 1 subsampling both horizontally and vertically for the two chrominance components.

In accord with the foregoing knowledge of the HVS, the present invention preferably implements the YCbCr model when compressing color images, wherein the "Y" (i.e., luminance) component preferably is used in determining whether the similarity threshold is met. It is noted that other luminance-chrominance models may be used, as well as the original RGB data, and that the chrominance components may also be considered in determining whether the similarity threshold is met.

With reference to FIG. 1B, the process for compressing color images begins in a start loop block 66, which is applied to each triangle produced in a recursive fashion. First, the RGB color component values for the pixels are converted to YCbCr values per equation 1 in a block 68. While this step is shown within the processing loop of each triangle, this step may be performed on all of the pixels within the image or video frame prior to dividing the image area into squares, or for each square.

The following steps are then applied to each color component, as indicated by a start loop block 70. First, in a block 72 the value of the component is determined for each vertex point. Estimated values for each of the pixels in the triangle are then calculated (preferably by interpolation) using the component values at the vertex points, as provided by a block 74. In a block 76, a similarity comparison calculation is then performed comprising summing the squared differences between the interpolated values and the actual values of the color component for each pixel and taking the square root of the sum and dividing by the area of the triangle. The calculated similarity value is then compared with a threshold value in a decision block 78 to determine whether the triangle needs to be further divided. If the threshold is not exceeded and further color components need to be evaluated for the triangle, the logic loops back from a loop end block 79 to start loop block 70, and the next color component is evaluated using the same process. However, it should be noted that it is preferable to use a lower threshold value for the luminance (Y) component than the chrominance (Yb, Yr) components, since the HVS is more sensitive to luminance. Furthermore, in an alternative embodiment, only the luminance component needs to be evaluated to determine whether the interpolated pixel values are similar enough to the actual pixel values to meet the threshold requirement.

If the threshold is exceeded for any of the color components (if all three components are evaluated) or for the luminance component (if only the luminance component is evaluated), the logic flows to an optional decision block 80 in which it is determined whether the pixel component values correspond to a predefined texture map, in a manner similar to that described above. If texture mapping is applicable, the texture map data is saved in a block 81, and the logic proceeds to end loop block 79. If texture mapping isn't applicable, the logic flows to a block 82 that divides the triangle from the midpoint of its hypotenuse to its right angle corner, and the logic loops back to start block 66 to begin evaluation of one of the new triangles that is created.

After each of the color components has been evaluated, the logic flows to a decision block 84 in which a determination is made to whether there are any more triangles or squares to process. If the answer is yes, the logic loops back to the appropriate loop start block and processing of the next triangle or square begins. After all of the squares and triangles have been processed, data is generated comprising the X and Y values of each vertex and the color component values for that vertex. If texture mapping is applicable, the compressed image data will also include separate data strings or data structures for each texture mapping instance. In addition, the data may include information pertaining to the order of interpolation used. As an optional step, the data may be compressed in a block 86 using on of the data compression schemes discussed above.

Pixel Interpolation Based on Edge Data

Figure 4:
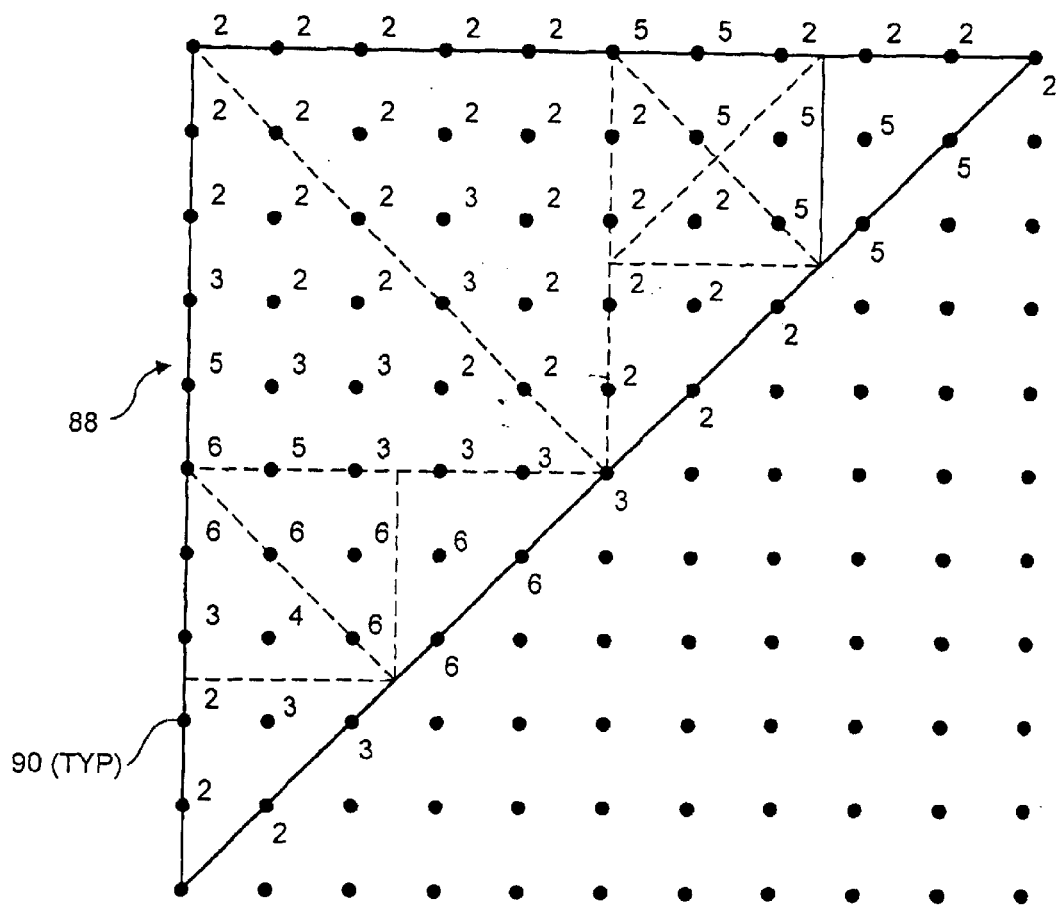
FIG. 4 shows a grid of pixels wherein the component values for pixels that are on the edge of a triangle are used for interpolating predicted component values of pixels within the triangle.

In some instances, especially when there is a large amount of detail in an image, it may be advantageous to interpolate the pixel component values based on the actual values of the pixels in the edges (i.e., lines) that form the triangles rather than using just the three vertex values. For example, consider a triangle 88 shown in FIG. 4, which includes a plurality of pixels 90. Each pixel 90 has a grayscale intensity value disposed adjacent to it corresponding to a scale from 0 to 7, wherein 0 represents a minimum intensity level and 7 represents a maximum intensity level.

As depicted in the drawing, there are several bands having different intensity levels that run across triangle 88. For example, each of the pixels with a grayscale intensity value of 6 comprises a portion of a band, while groups of pixels with intensity value of 3 and 1 respectively comprise other bands. Bands of this type are often encountered within images.

Under the present embodiment, the intensity values for the pixels within the boundary defined by the edges of a given triangle are interpolated based on the values of the pixels in the triangle edges. As a result, banded regions within triangles will generally be stored in the compressed image data such that these regions are accurately reproduced upon decompressing the data. Furthermore, the number of triangles that are required to create an accurate image definition may be sharply reduced, as is shown by the dashed lines in the Figure, wherein these lines represent triangles that would normally have been produced if only the vertex data was used for interpolation.

In addition to interpolation using triangle edge data, it also may be desirable to ensure that individual triangle edges are not recognized when the image data is decompressed. This can be accomplished by having the three vertices of each triangle define a surface by setting the second derivative with respect to the color of a raster line on the image as it crosses the line between to vertices to zero. This will smooth out any abrupt change in the slope, resulting in triangles that are substantially invisible to the human eye, even at the highest, lossiest compression settings.

Figure 5A:
FIG. 5A is an exemplary image prior to compression by the present invention.
Figure 5C:
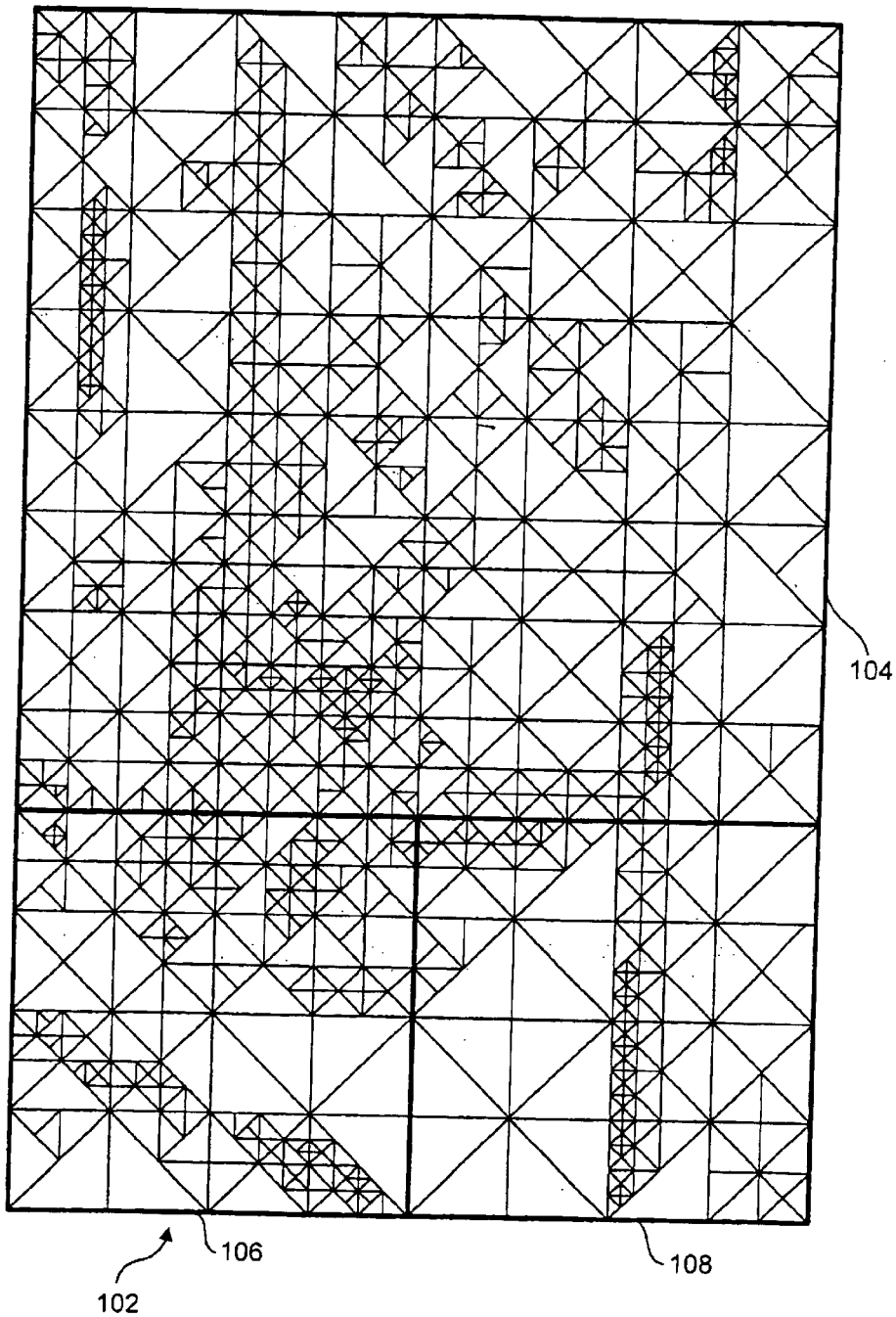
FIG. 5C shows the exemplary set of triangles apart from the image.

An application of the present invention when used to compress an exemplary grayscale image is now described with reference to FIGS. 5A–C. FIG. 5A shows a still grayscale image 100 of a cat in a doorway, comprising 600 pixels high by 400 pixels wide. FIG. 5B illustrates an exemplary set of triangles 102 that are created during compression of image 100 by the present invention, wherein the triangles are overlaid on top of the image. FIG. 5C shows triangle set 102 separately.

In accord with the method described above, image 100 is first divided into a (preferably minimum) number of squares, including a large square 104 comprising 400×400 pixels, and two smaller squares 106 and 108, comprising 200×200 pixels each. Beginning with square 104, the square is first divided in half along one of its diagonals, and then the similarity comparison threshold evaluation corresponding to blocks 28–36 in FIG. 1A is performed reiteratively, creating multiple triangles, each subdividing a previous triangular area in half. As can be recognized by examining FIG. 5B, the density of the triangles is approximately proportional to the level of detail in each area of square 104 (and for square 106 and 108 as well). For example, small triangles are necessary to accurately store data corresponding to the details of the cat and the curves in the gate, while larger triangles may be used for lower detail areas, such as the wall on the right-hand side of the image. Smaller triangles are also necessary for high-contrast areas, such as the near-vertical lines appearing behind the cat. In addition, where applicable, texture mapping may be performed.

The same process that was used for square 104 is then applied to each of squares 106, resulting in a set of image data in a compressed format. The set of image data may then be compressed using one of the well-known data compression algorithms discussed above.

As discussed above, the method additionally enables a user to define one or more areas within an image that are to be compressed such that the detail in these areas is preserved at a higher level than other areas in the image that are not selected. For example, the user may determine that he wants the cat in FIG. 5A to be preserved with a higher degree of detail than other areas in the image. Accordingly, the user may draw a box 110 around the cat (through use of an appropriate user interface) to identify to an application program implementing the invention that the user wishes this area of the image to be compressed such that the area's detail is preserved at a higher level than other areas in the drawing. There are several ways this can be implemented, including lowering the threshold value for triangles that are contained within and/or overlap the selected area(s).

Decompressing Image Data

Figure 6:
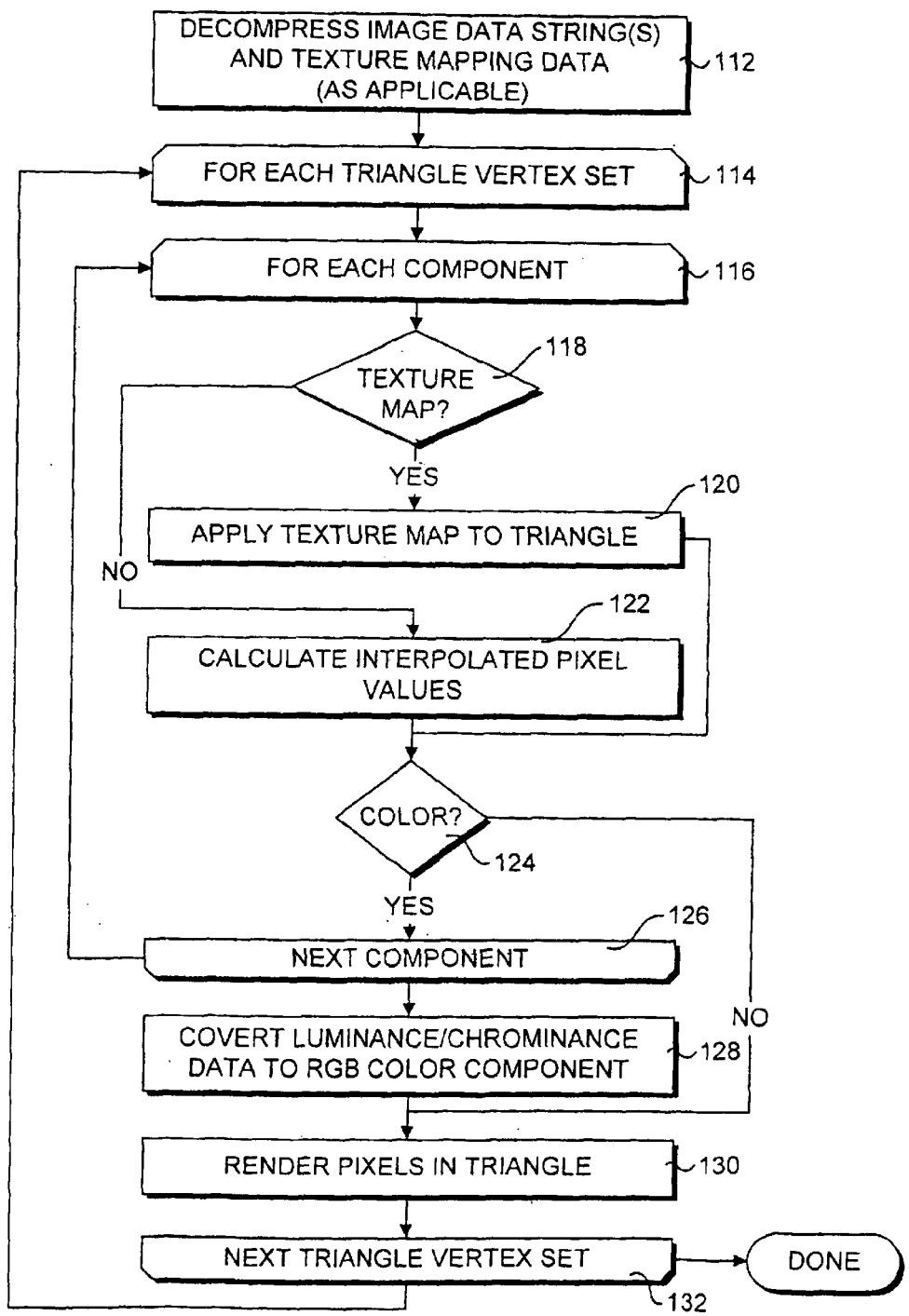
FIG. 6 is a flowchart illustrating the logic used by the present invention when decompressing an image.

Decompressing the image data to produce an image essentially comprises reversing the steps used in creating the compressed image data discussed above. With reference to FIG. 6, the decompression process begins in a block 112 in which the image data string(s), data structures and any texture mapping data is decompressed if the same was compressed during the image compression process. Next, a start loop block 114 identifies the start of a process loop that reiteratively generates pixel data for each of the triangles that was compressed during the compression process discussed above, wherein the data for each of the triangles comprises either a set of vertices, data corresponding to the edges of the triangle, or a set of vertices with texture mapping data. If the data corresponds to a color image, then similar processing steps are applied to each color component, as indicated by a start block 116.

In a decision block 118, a determination is made to whether texture mapping is to applied to the triangle. If the answer is yes, than an appropriate predetermined texture mapping pattern is used to create component intensity values for each of the pixels within the triangle, as provided by a block 120. If the answer is no, the interpolated values for each of the pixels in the triangle are determined in a block 122 through use of either the vertices data or-triangle edge data and corresponding interpolation order data.

The logic flows next to a decision block 124 in which a determination is made to whether the data corresponds to a color image. If the answer is yes, the logic reaches an end block 126 that causes the process to loop back to start block 116 and begin processing the next color component if additional color components are left to be evaluated. Once all of the color components have been processed, they are converted from luminance/chrominance values to RGB values in a block 128. Note that if the data was never converted from RGB to luminance/chrominance values this step does not occur.

After the data has been converted into an appropriate component set (e.g. RGB or grayscale), the pixels for the triangle are rendered in a block 130, whereupon the logic reaches an end block 132 that causes the logic to loop back to begin loop 114 and begin processing of the next triangle. After all of the triangles have been processed, rendering of the decompressed image is complete.

The rendering process creates varying effects, depending on the order in which the triangles are rendered. For example, the compressed data may be rearranged so that the largest enclosing triangles are rendered first, followed by the next enclosed interior triangle. As a result, the image will start out appearing fuzzy and will get progressively sharper. In addition, if various vertices are lost during transmission, the result won't be "holes", "black snow", or "pixilated" images, but rather will produce a loss of detail that will be overlooked by most viewers. Furthermore, the present invention's compression scheme easily scales to create scaled images of any size, without producing the "blocky" images that result when other compression schemes are used to produce scaled images. Scaling may be done by simply multiplying all the x, y values by a scale factor. Images can be easily stretched horizontally or vertically (e.g. like an anthropomorphic TV image) by scaling x, y with different scale factors.

Exemplary System for Implementing the Invention

Figure 7:
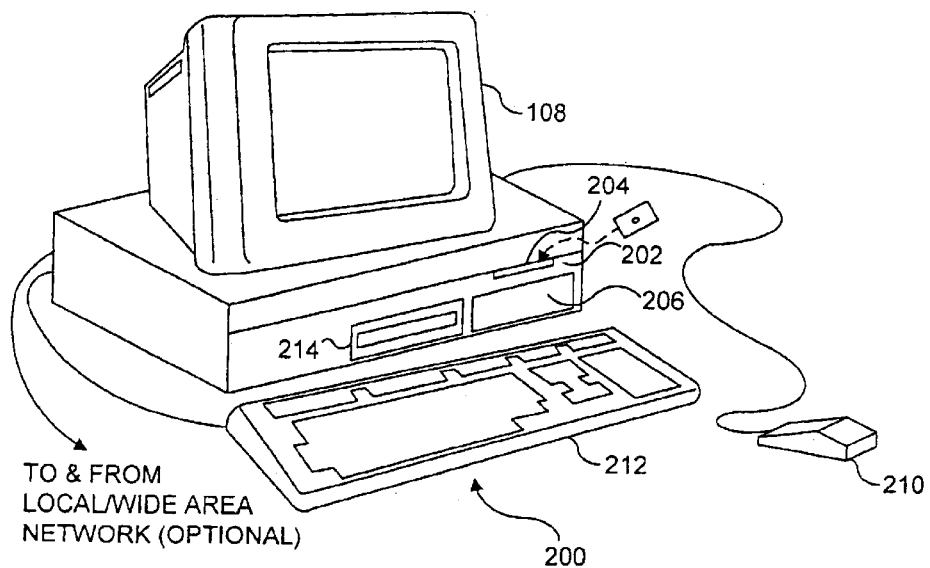
FIG. 7 illustrates an exemplary system for implementing the present invention.

With reference to FIG. 7, a generally conventional personal computer 200 is illustrated, which is suitable for use in connection with practicing the present invention. Alternatively, a corresponding workstation on a local area network may be used for executing machine instructions comprising a computer program that causes the present invention to be executed. Personal computer 200 includes a processor chassis 202 in which are mounted a floppy disk drive 204, a hard drive 206, a motherboard populated with appropriate integrated circuits (not shown), and a power supply (also not shown), as are generally well known to those of ordinary skill in the art. A monitor 208 is included for displaying graphics and text generated by software programs that are run by the personal computer, and for graphically representing images and video frames produced by the present invention. A mouse 210 (or other pointing device) is connected to a serial port (or to a bus port) on the rear of processor chassis 202, and signals from mouse 210 are conveyed to the motherboard to control a cursor on the display and to select text, menu options, and graphic components displayed on monitor 208 by software programs executing on the personal computer, such as a photo editing program that implements the present invention. In addition, a keyboard 212 is coupled to the motherboard for user entry of text and commands that affect the running of software programs executing on the personal computer.

Personal computer 200 also optionally includes a compact disk-read only memory (CD-ROM) drive 214 into which a CD-ROM disk may be inserted so that executable files and data on the disk can be read for transfer into the memory and/or into storage on hard drive 206 of personal computer 200. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A method for compressing image data corresponding to an image comprising a plurality of pixels defining a grid, each pixel having at least one component value, comprising:

dividing the grid into at least one rectangular area;

for each rectangular area;

dividing the rectangular area into a number of triangles, each triangle defining a boundary comprising three edges;

for each of triangle:

identifying the vertices of the triangle;

determining predicted pixel component values for at least a portion of the pixels enclosed within and/or on the boundary of the triangle;

comparing the predicted pixel component values with actual values of said at least one component value to determine if a similarity threshold is met;

processing a next triangle if the similarity threshold is met, otherwise, dividing the triangle into two new triangles, each defining a boundary and comprising three edges; and reiteratively repeating identifying the vertices, predicting pixel component values, and comparing actual and predicted pixel component values to determine if a similarity threshold is met for each existing triangle and any new triangles that are created; and generating compressed image data defining each triangle that is created and actual and predicted pixel component values within the triangle.

2. The method of claim 1, wherein the compressed image data comprises at least one string, the method further comprising compressing said at least one string using a data compression algorithm.

3. The method of claim 1, wherein at least a portion of the triangles are defined by data identifying pixels coincident with or proximate to a set of vertices for the triangle, and the predicted pixel component values for those triangles are determined by interpolating actual pixel component values at the vertices of each triangle.

4. The method of claim 1, wherein the predicted pixel component values are determined by interpolating actual component values corresponding to pixels that lie on and/or proximate to the edges of each triangle.

5. The method of claim 1, wherein the image is a grayscale image, and said at least one component value comprises a grayscale intensity level.

6. The method of claim 1, wherein the image comprises a color image, and said at least one component value comprises three color component values.

7. The method of claim 6, wherein the three color component values comprise a Red component value, a Green component value, and a Blue component value, further comprising converting the Red, Green, and Blue component values into luminance/chrominance component values.

8. The method of claim 7, wherein said comparing of the predicted pixel component values to determine if the similarity threshold is met comprises giving a similarity determination that compares predicted and actual luminance component values greater weight than a similarity determination that considers predicted and actual chrominance component values.

9. The method of claim 1, further comprising:
determining if a texture map can be applied to pixels of a given triangle to meet the similarity threshold; and
storing data identifying the pixels within and/or on the triangle boundary and data corresponding to the texture map for any triangle for which it is determined that texture mapping can be applied.

10. The method of claim 1, wherein each of said at least one rectangle comprises a square.

11. The method of claim 10, wherein the image comprises a plurality of pixels contained within a rectangular grid, and wherein the rectangular grid is divided into a number of non-overlapping squares that contain all of the pixels within the rectangular grid.

12. The method of claim 1, wherein at least one triangle comprises a right angle corner and a hypotenuse, and where dividing said at least one triangle into two triangles comprises dividing said at least one triangle along a line connecting a midpoint of the hypotenuse to the right angle corner.

13. A method for reproducing an image based on a set of compressed image data corresponding to an original image comprising a plurality of pixels defining a grid, said compressed image data including data defining a plurality of triangles and pixel component values corresponding to each of said plurality of triangles, comprising:

extracting a first set of vertices for a first of the triangles;
determining first component values of pixels within the first triangle;

rendering first triangle in accord with the first set of vertices and first component values determined for the first triangle;

extracting a second set of vertices for a second of the triangles, the second triangle being nested within the first triangle;

determining second component values of pixels within the second triangle;

rendering the second triangle in accord with the second set of vertices and second component values determined for the second triangle.

14. The method of claim 13, wherein at least either the first component values are determined as a function of component values at the first vertices of the first triangle, or the second component values are determined as a function of component values at the second vertices of the second triangle.

15. The method of claim 14, wherein at least either the first component values are determined by interpolating component values at the first vertices of the first triangle, or the second component values are determined by interpolating component values at the second vertices of the second triangle.

16. The method of claim 13, wherein at least either the first component values are determined as a function of component values corresponding to pixels defining first edges of the first triangle, or the second component values are determined as a function of component values corresponding to pixels defining second edges of the second triangle.

17. The method of claim 13, further including:
applying texture mapping to the pixels contained within the second triangles.

18. The method of claim 13, wherein said determining of first and second component values include converting respective first and second luminance/chrominance color model data to first and second red, green and blue (RGB) color components for the pixels of the first and second triangles.

19. A system for compressing image data corresponding to an image comprising a plurality of pixels defining a grid, each pixel having at least one component value, comprising:

a memory in which machine instructions are stored; and
a processor coupled to the memory for executing the machine instructions, said processor implementing a plurality of functions when executing the machine instructions, including:

dividing the grid into at least one rectangular area;
for each rectangular area;
dividing the rectangular area into a number of triangles, each triangle defining a boundary comprising three edges;
for each of triangle:
identifying the vertices of the triangle;
determining predicted pixel component values for at least a portion of the pixels enclosed within and/or on the boundary of the triangle;
comparing the predicted pixel component values with actual values of said at least one component value to determine if a similarity threshold is met;
processing a next triangle if the similarity threshold is met, otherwise,
dividing the triangle into two new triangles, each defining a boundary and comprising three edges; and
reiteratively repeating identifying the vertices, predicting pixel component values, and comparing actual and predicted pixel component values for each existing triangle and any new triangles that are created; and generating compressed image data defining each triangle that is created and actual and predicted pixel component values within the triangle.

20. The system of claim 19, wherein at least a portion of the triangles are defined by data identifying pixels coincident with or proximate to a set of vertices for the triangle, and the predicted pixel component values are determined by interpolating actual pixel component values at the vertices of each triangle.

21. The system of claim 19, wherein the predicted pixel component values are determined by interpolating actual component values corresponding to pixels that lie on and/or proximate to the edges of each triangle.

22. The system of claim 19, wherein the image comprises a color image, and said at least one component value comprises a Red component value, a Green component value, and a Blue component value, and wherein execution of the machine instructions by the processor further implements the function of converting the Red, Green, and Blue component values into luminance/chrominance component values.

23. The system of claim 19, wherein execution of the machine instructions by the processor further implements the functions of:

determining if a texture map can be applied to pixels of a given triangle to meet the similarity threshold; and storing data identifying the pixels within and/or on the triangle boundary and data corresponding to the texture map for any triangle for which it is determined that texture mapping can be applied.

24. The system of claim 19, wherein the image comprises a plurality of pixels contained within a rectangular grid, and wherein the rectangular grid is divided into a minimum number of non-overlapping squares that contain all of the pixels within the rectangular grid.

25. An article of manufacture for compressing image data corresponding to an image comprising a plurality of pixels defining a grid, each pixel having at least one component value, comprising:

a memory media adapted to be used with a computer; and a plurality of machine instructions stored on the memory media, said machine instructions effecting a plurality of functions when executed by the computer, including:

dividing the grid into at least one rectangular area;

for each rectangular area:

dividing the rectangular area into a number of triangles, each triangle defining a boundary comprising three edges;

for each of triangle:

identifying the vertices of the triangle;

determining predicted pixel component values for at least a portion of the pixels enclosed within and/or on the boundary of the triangle;

comparing the predicted pixel component values with actual values of said at least one component value to determine if a similarity threshold is met;

processing a next triangle if the similarity threshold is met, otherwise, dividing the triangle into two new triangles, each defining a boundary and comprising three edges; and reiteratively repeating identifying the vertices, predicting pixel component values, and comparing actual and predicted pixel component values for each existing triangle and any new triangles that are created; and generating compressed image data defining each triangle that is created and actual and predicted pixel component values within the triangle.

26. The article of manufacture of claim 25, wherein at least a portion of the triangles are defined by data identifying pixels coincident with or proximate to a set of vertices for the triangle, and the predicted pixel component values are determined by interpolating actual pixel component values at the vertices of each triangle.

27. The article of manufacture of claim 25, wherein the predicted pixel component values are determined by interpolating actual component values corresponding to pixels that lie on and/or proximate to the edges of each triangle.

28. The article of manufacture of claim 25, wherein the image comprises a color image, and said at least one component value comprises a Red component value, a Green component value, and a Blue component value, and wherein said functions effectuated when executed by the computer further include the function of converting the Red, Green, and Blue component values into luminance/ chrominance component values.

29. The article of manufacture of claim 25, wherein said functions effectuated when executed by the computer further include the functions of:

determining if a texture map can be applied to pixels of a given triangle to meet the similarity threshold; and storing data identifying the pixels within and/or on the triangle boundary and data corresponding to the texture map for any triangle for which it is determined that texture mapping can be applied.

30. The article of manufacture of claim 25, wherein the image comprises a plurality of pixels contained within a rectangular grid, and wherein the rectangular grid is divided into a minimum number of non-overlapping squares that contain all of the pixels within the rectangular grid.

* * * * *

UNITED STATES PATENT AND TRADEMARK OFFICE
CERTIFICATE OF CORRECTION

PATENT NO. : 6,897,977 B1  Page 1 of 1
APPLICATION NO. : 09/718879
DATED : May 24, 2005
INVENTOR(S) : Walter Bright It is certified that error appears in the above-identified patent and that said Letters Patent is hereby corrected as shown below:

In Figure 7:
"108" should read --208--.

In Column 3:
Line 43, "...from a paterrn..." should read --...form a pattern...--.

In column 4:
Line 56, "...corner points 14..." should read --...corner points 1-4...--.
Lines 63-64, "...grid 10..." should read --...grid 12...--.

In column 5:
Line 33, "...will comprises..." should read --...will comprise...--.

In Column 11:
Line 20, "...than..." should read --...then...--.
Line 25, "...or-triangle..." should read --...or triangle...--.

In Column 14
Line 1, "...rendering first set..." should read --...rendering the first set...--.

Signed and Sealed this

Eleventh Day of August, 2009

David J. Kappos
*Director of the United States Patent and Trademark Office*